(12) United States Patent
Kong (10) Patent No.: US 9,653,749 B2
(45) Date of Patent: May 16, 2017

(54) SECONDARY BATTERY AND SECONDARY BATTERY PACK HAVING THE SAME

(71) Applicant: SK Innovation Co., Ltd., Seoul (KR)

(72) Inventor: Ming Zhe Kong, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 432 days.

(21) Appl. No.: 14/309,232

(22) Filed: Jun. 19, 2014

(65) Prior Publication Data

US 2014/0377633 A1    Dec. 25, 2014

(30) Foreign Application Priority Data

Jun. 21, 2013  (KR) ........................ 10-2013-0071287

(51) Int. Cl.
*H01M 2/02* (2006.01)
*H01M 10/04* (2006.01)
*H01M 2/34* (2006.01)
*H01M 2/10* (2006.01)

(52) U.S. Cl.
CPC ..... *H01M 10/0468* (2013.01); *H01M 2/0207* (2013.01); *H01M 2/345* (2013.01); *H01M 2/0275* (2013.01); *H01M 2/1016* (2013.01); *H01M 2200/10* (2013.01)

(58) Field of Classification Search
None
See application file for complete search history.

(56) References Cited

U.S. PATENT DOCUMENTS

| 8,133,609 B2 | 3/2012 | Kim et al. | |
| 2011/0039147 A1* | 2/2011 | Cheon | ................... H01M 2/206 429/159 |

* cited by examiner

*Primary Examiner* — Basia Ridley
*Assistant Examiner* — Heng Chan
(74) *Attorney, Agent, or Firm* — The Webb Law Firm (57) ABSTRACT

Provided are a secondary battery and a secondary battery pack having the same capable of preventing performance degradation by preventing an increase in an interface resistance of an electrode body accommodated in a pouch and capable of improving stability by preventing deformation of the electrode body to thereby prevent a fine short circuit even though the pouch is swelled due to a gas generate at a high temperature, by providing first members for reinforcing rigidity and second members deformed at the high temperature and capable of adhering the electrode body to one side or both sides of the electrode body accommodated and sealed in the pouch.

12 Claims, 6 Drawing Sheets

SECONDARY BATTERY AND SECONDARY BATTERY PACK HAVING THE SAME

CROSS-REFERENCE TO RELATED APPLICATION

This application claims priority to Korean Patent Application No. KR 10-2013-0071287 filed Jun. 21, 2013, the disclosure of which is hereby incorporated in its entirety by reference.

TECHNICAL FIELD

The present invention relates to a secondary battery capable of preventing performance degradation by preventing an increase in an interface resistance of an electrode body accommodated in a pouch and capable of improving stability by preventing deformation of the electrode body to prevent a fine short circuit, and a secondary battery pack having the same.

BACKGROUND

Generally, since a secondary battery may be charged and discharged unlike a primary battery, the secondary battery has been applied to various fields such as a digital camera, a cellular phone, a notebook, and a hybrid vehicle and has been actively studied. An example of the secondary battery includes a nickel-cadmium battery, a nickel-metal hydride battery, a nickel-hydrogen battery, and a lithium secondary battery. Among these secondary batteries, the lithium secondary battery having high energy density and discharging voltage has been mainly studied and has been commercialized and widely used.

In addition, the lithium secondary battery may be manufactured in various types. As a typical type of the lithium secondary battery, there are a cylinder type and a prismatic type that may be mainly used for a lithium ion battery. A lithium polymer battery that has been recently spotlighted is manufactured in a pouch type having flexibility, such that a shape thereof is relatively free.

In this case, the pouch type secondary battery is formed to have an electrode body sealed by a pouch so that the electrode body is accommodated in the pouch and electrode tabs connected to the electrode body are protruded to the outside.

However, the pouch type secondary battery described above causes a swelling phenomenon that gas is generated in the pouch at a high temperature by a temperature increase according to the charging and discharging to thereby swell the pouch. Accordingly, an interface resistance of the electrode body is increased, such that performance of the secondary battery may be degraded. In addition, the electrode body is deformed due to the swelling phenomenon to thereby cause a fine short circuit, such that a risk of ignition may be increased.

RELATED ART DOCUMENT

[Patent Document] U.S. Pat. No. 8,133,609 B2 (Dec. 13, 2012)

SUMMARY

An embodiment of the present invention is directed to providing a secondary battery capable of preventing an increase in an interface resistance, deformation, and a fine short circuit of an electrode body by allowing the electrode body to be adhered even in the case in which a pouch is swelled at a time of high temperature, and a secondary battery pack having the same.

In one general aspect, a secondary battery includes: a pouch; an electrode body accommodated and sealed in the pouch; first members provided in the pouch and provided to one side or both sides of the electrode body to support the electrode body; and second members provided in the pouch to be parallel to the first members and provided between the first members and the pouch to be convexly deformed toward the pouch according to a temperature increase.

The second member may have at least one side coupled and fixed to the first member.

The second member may have a deformation degree increased according to the temperature increase based on a room temperature.

The second member may initiate the deformation thereof before a gas is generated in the pouch.

The second member may have a cross-section deformed in an arc shape.

The second member may have a portion which is not deformed even though the temperature is increased, and the portion which is not deformed is maintained to be parallel to the first member.

In another general aspect, a secondary battery pack includes: the plurality of secondary batteries as described above stacked and arranged to be parallel to each other and electrically connected to each other; a case having the plurality of secondary batteries accommodated therein; and electrode terminals formed on the case and connected to electrode tabs of the secondary battery disposed at the outermost portion, wherein second members of the secondary batteries are not restored to an original state after being deformed and are maintained in a deformed state, such that the electrode terminal and the electrode tab of the secondary battery of the outermost portion are short-circuited and again not connected to each other when the secondary batteries are swelled due to a temperature increase.

[Detailed Description of Main Elements]

| | |
|---|---|
| 1000: secondary battery | 100: pouch |
| 200: electrode body | 210: electrode tab |
| 300: first member | 400: second member |

[Detailed Description of Main Elements]

| 410: horizontal part | 420: deformation part |
|---|---|
| 1100: case | 1200: electrode terminal |
| 2000: secondary battery pack | |

DETAILED DESCRIPTION OF EMBODIMENTS

Hereinafter, a secondary battery and a secondary battery pack having the same according to an embodiment of the present invention as described above will be described in detail with reference to accompanying drawings.

Figure 1:
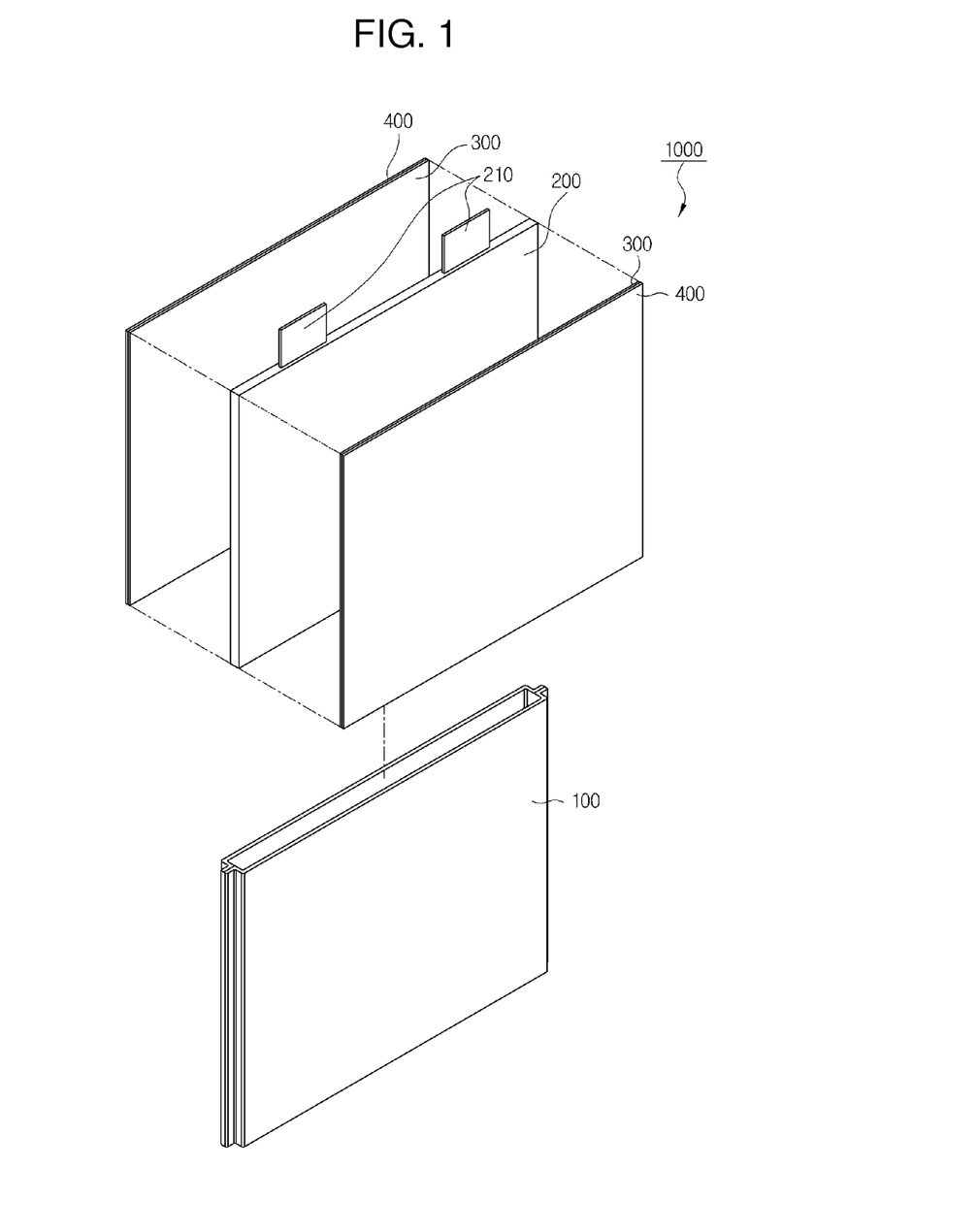
FIGS. 1 and 2 are an exploded perspective view and an assembly perspective view showing a secondary battery according to an exemplary embodiment of the present invention.
Figure 2:
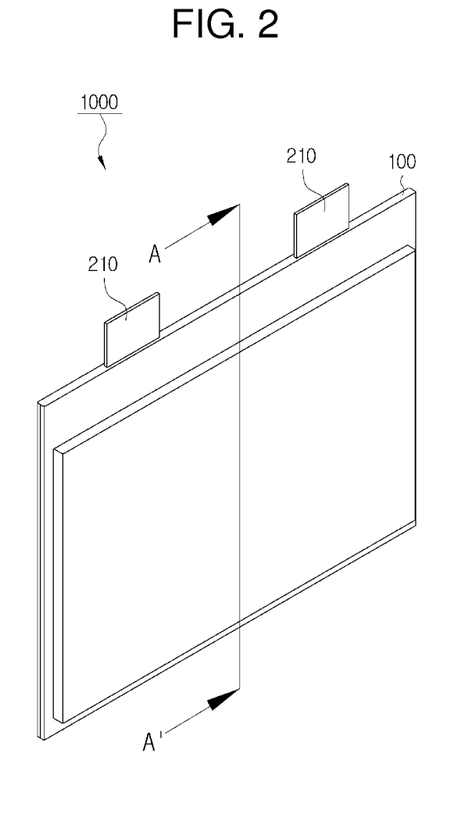
Figure 3:
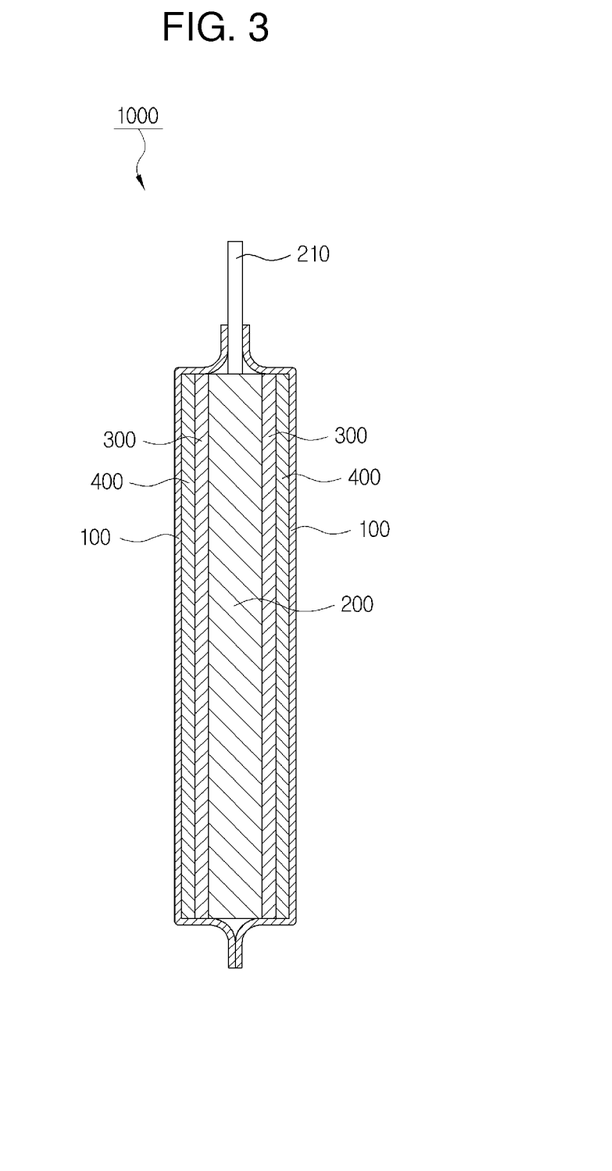
FIG. 3 is a cross-sectional view taken along the direction A-A' of FIG. 2.
Figure 4:
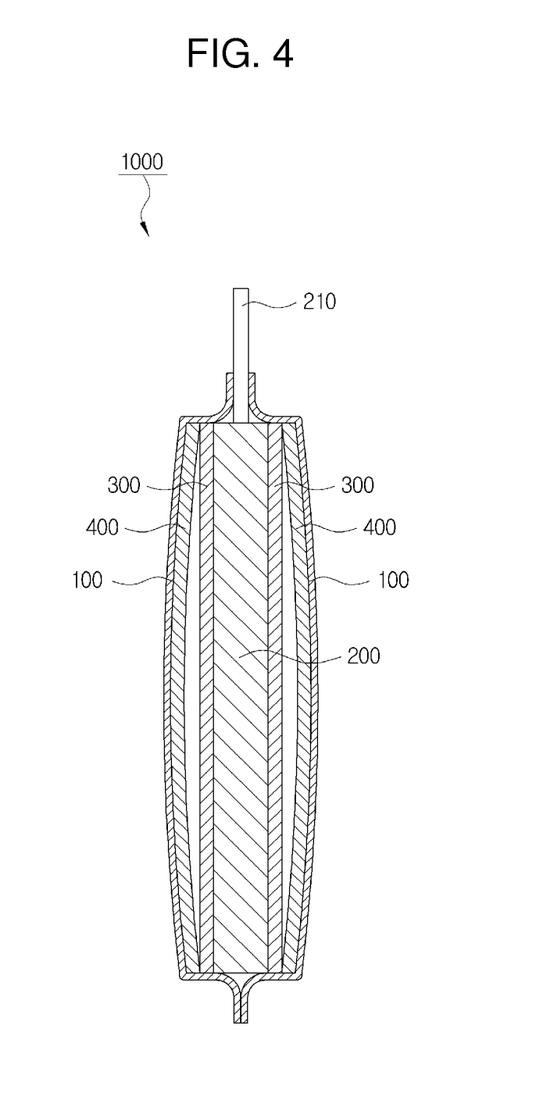
FIG. 4 is a cross-sectional view showing a state of a second member after the second member is deformed according to a temperature increase.

FIGS. 1 and 2 are an exploded perspective view and an assembly perspective view showing a secondary battery according to an exemplary embodiment of the present invention, and FIGS. 3 and 4 are cross-sectional views of the secondary battery according to an embodiment of the present invention, wherein FIG. 3 shows a state before deformation and FIG. 4 is a cross-sectional view showing a state after the deformation according to a temperature increase.

As shown, a secondary battery 1000 according to an embodiment of the present invention may include a pouch 100; an electrode body 200 accommodated and sealed in the pouch 100; first members 300 provided in the pouch 100 and provided to one side or both sides of the electrode body 200 to support the electrode body 200; and second members 400 provided in the pouch 100 to be parallel to the first members 300 and provided between the first members 300 and the pouch 100 to thereby be convexly deformed toward the pouch 100 according to a temperature increase.

First, as shown in FIGS. 1 and 2, the pouch 100 is formed to be able to enclose and seal the electrode body 200, and the electrode body 200 has electrode tabs 210 formed at one side or both sides thereof to be extended and is configured so that the pouch 100 seals and encloses only the electrode body 200 except for the electrode tabs 210.

That is, the pouch 100 is formed to seal the electrode body 200, wherein the electrode body 200 may be sealed by thermal-bonding an edge of the pouch 100 in a state in which the electrode body 200 is accommodated in the pouch 100 and the electrode tabs 210 may be formed to be leaded to the outside of the pouch 100.

Here, the pouch 100 may be made of an aluminum laminate packaging material, wherein the aluminum laminate packaging material, which is a packaging material manufactured in a thin and flexible form by depositing a plastic thin film such as a polyethylene (PE) thin film on a thin aluminum (Al) plate, may secure insulation from the electrode body 200 and allow the electrode tabs 210 to be leaded to the outside by the thermal bonding to thereby be easily sealed.

The electrode body 200 may have the electrode tabs 210 formed at one side or both sides thereof. That is, the electrode body 200 may have a positive electrode tab and a negative electrode tab formed at one side thereof, or have the positive electrode tab formed at one side thereof and the negative electrode tab formed at the other side thereof.

In addition, the electrode body 200 is formed by alternately stacking a plurality of positive electrode plates and negative electrode plates to be parallel to each other and each of separation membranes is interposed between the positive electrode plate and the negative electrode plate. The electrode body 200 as described above may be adhered by interposing the separation membrane between the positive electrode plate and the negative electrode plate and on an outer side of the positive electrode plate or the negative electrode plate disposed at the outermost portion.

In addition, the pouch 100 having the electrode body 200 accommodated and sealed therein may be filled with an electrolyte, wherein the electrolyte, which is an intermediate medium allowing ions to be moved between the positive electrode plate and the negative electrode plate, may be formed in a liquid, gel, or solid form. In this case, the electrolyte is filled in the pouch 100 and is configured so that the ions are transferred by passing through the separation membrane between the positive electrode plate and the negative electrode plate.

The first members 300 may be provided in the pouch 100 and may be provided at one side or both sides of the electrode body 200. In this case, the first members 300 is accommodated and then sealed in the pouch 100 in a state in which it is adhered to the electrode body 200 to support the electrode body 200, the first members 300 are formed in a plate shape of a material having large rigidity and adhered to the electrode body 200 to prevent deformation of the electrode body 200, and the first members 300 may be formed to have the same size as that of the electrode body 200 so that the first members 300 may be adhered to the overall surface of the electrode body 200.

In addition, the first members 300 may be provided to one side of the electrode body 200, and as shown, the first members 300 are provided to both sides of the electrode body 200 to be adhered to both sides of the electrode body 200, thereby making it possible to prevent the deformation of the electrode body 200.

The second members 400 are provided in the pouch 100 and are provided to be parallel to the first members 300. In addition, the second members 400 are provided between the first members 300 and the pouch 100 and are formed to be convexly deformed toward the pouch 100 according to the temperature increase.

That is, the second members 400 are provided in the pouch 100 in a form in which they are adhered to the first members 300 and stacked on the first members 300 to be parallel to the first members 300, as shown in FIG. 3, and are configured to be convexly bent toward the pouch 100 according to the temperature increase of the electrode body 200 caused by the charging and discharging, as shown in FIG. 4.

In this case, the second members 400 may be formed of a shape memory alloy or a bimetal so that a shape thereof is deformed according to a temperature change.

Here, in a case of the secondary battery, when the temperature of the electrode body 200 is increased by the charging and discharging, the pouch 100 is swelled due to evaporation of the electrolyte filled in the pouch 100, or the temperature is increased and an ignitable gas is generated by a fine short circuit of the electrode body 200. Thereby, because the electrode body 200 is not adhered, interface resistances of the positive electrode plate, the negative electrode plate, and the separation membrane constituting the electrode body 200 are increased, such that performance of the secondary battery may be degraded. In addition, the pouch 100 is swelled due to the gas generated from the pouch 100 and the electrode body 200 is deformed, such that the fine short circuit may be generated. Thereby, the ignitable gas may be generated, such that there is a risk of ignition and explosion.

Therefore, in the secondary battery 1000 according to the embodiment of the present invention, when the temperature of the electrode body 200 is increased by the charging and discharging, the second members 400 are deformed to be convexly bent toward the pouch 100 and the first members 300 adheres the electrode body 200 by the deformed second members 400 to allow the stacked positive electrode plate, the negative electrode plate, and the separation membrane constituting the electrode body 200 to be adhered to each other, such that the interface resistance may be maintained so as not be increased, thereby making it possible to prevent the performance of the secondary battery from being degraded. In addition, because the electrode body 200 is not deformed, the fine short circuit of the electrode body 200 may be prevented, thereby making it possible to decrease the generation of the ignitable gas and the risk of ignition and explosion caused by the short circuit.

In this case, at least one side of the second members 400 may be coupled to the first members 300 to be fixed. That is, the second members 400 may be formed in an integral form in which the second members 400 are coupled to the first members 300 and one side thereof is fixed, and the second members 400 may be formed in a form in which both sides thereof are coupled to the first members 300 or both sides and a central portion are coupled to each other. As such, because the secondary battery is formed in a state in which the second members 400 are coupled to the first members 300, an assembly thereof may be easy, and because the second members 400 are coupled to the first members 300, even though the second members 400 are deformed according to the temperature increase, deviation in a plane direction of the second member 400 in the pouch 100 and damage (tear) of the pouch 100 caused by the deviation may be prevented.

In addition, the second member 400 may be formed so that a deformation degree thereof becomes large as the temperature is increased based on a room temperature. That is, the second member 400 may be formed to be adhered in a non-deformed form between the first member 300 and the pouch 100, and to be gradually convexly bent toward the pouch 100 by having an increased deformation degree as the temperature is increased. Because the gas generated from the pouch 100 may be increased as the temperature is increased, the second member 400 is formed to have the increased deformation degree according to the temperature, such that the electrode body 200 may be completely adhered thereto even though the temperature is gradually increased. As a result, the increase in the interface resistance of the electrode body 200 according to the temperature increase may be prevented, thereby making it possible to prevent the performance degradation of the secondary battery.

In addition, the second member 400 may be formed so that the deformation thereof is initiated before the gas is generated in the pouch 100. The second member 400 is formed so as to be deformed from a temperature before the gas is generated, because the pouch 100 is swelled and does not adhere the electrode body 200, in the case in which the gas is generated in the pouch 100. In this case, because the temperature at which the gas is generated is about 30° C. to 40° C., the second member 400 may be formed to initiate the deformation before about 30° C.

In addition, the second member 400 has a cross-section deformed in an arc shape. That is, the second member 400 is deformed according to the temperature increase and the cross-section thereof is deformed in the arc shape, such that force acting on the pouch 100 may be evenly distributed by the deformation of the second member 400. As a result, the damage of the pouch 100 caused by the deformation of the second member 400 may be prevented and both sides of the deformed second member 400 may pressure the first member 300 to allow the electrode body 200 to be adhered to the first member 300. In addition, because the cross-section of the second member 400 is deformed in the arc shape, the second member 400 in a plane shape before being deformed may be deformed in a spherical shape having a convex central portion.

Figure 5A:
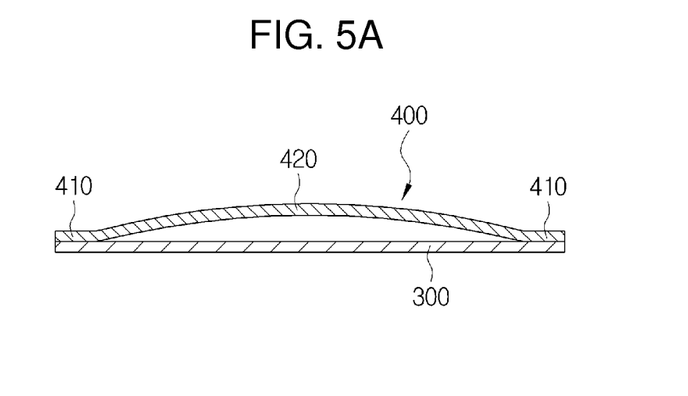
FIGS. 5A and 5B are a cross-sectional view showing a modified example of the second member according to the present invention.
Figure 5B:
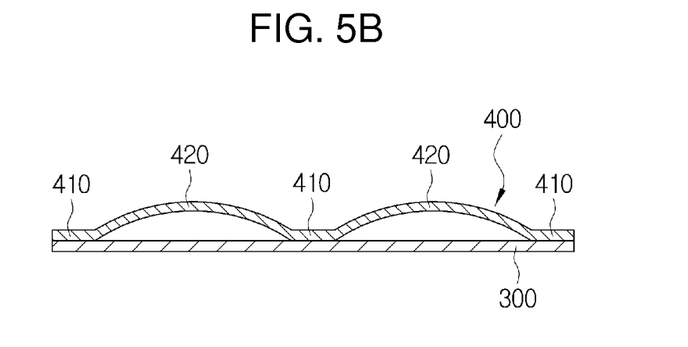

In addition, the second member 400 may have a portion which is not deformed even though the temperature is increased, and the portion which is not deformed may be maintained to be parallel to the first member 300. That is, as shown in FIGS. 5A and 5B, the second member 400 has a deformation part 420 formed to convexly deform only the central portion thereof and horizontal parts 410 formed so as not to deform both sides, such that the horizontal parts 410 may be adhered to the first member 300 to be parallel to the first member 300. As a result, when the second member 400 is deformed, the first member 300 may be more stably adhered to the electrode body 200. In this case, as shown in FIG. 5A, both sides of the second member 400 may be formed by the horizontal parts 410, and the entire edge thereof may be formed by the horizontal parts 410. In addition, as shown in FIG. 5B, both sides and the central portion of the second member 400 may be formed by the horizontal parts 410, and the deformation part 420 may be formed between the horizontal parts 410. In addition, a plurality of deformation parts 420 may be formed and may be formed in a various shape such as an embossing shape, and the like.

In addition, a secondary battery pack 2000 according to an embodiment of the present invention may include a plurality of secondary batteries 1000 stacked and arranged to be parallel to each other and electrically connected to each other; a case 1100 having the plurality of secondary batteries 1000 accommodated therein; and electrode terminals 1200 formed on the case 1100 and connected to an electrode tab 210 of the secondary battery 1000 disposed at the outermost portion, wherein the second members 400 of the secondary batteries 1000 are not restored to an original shape after being deformed and are maintained in a deformed state, so they are formed so that the electrode terminal 1200 and the electrode tab 210 of the secondary battery 1000 of the outermost portion are short-circuited and are again not connected to each other when the secondary batteries 1000 are swelled due to the temperature increase.

Figure 6:
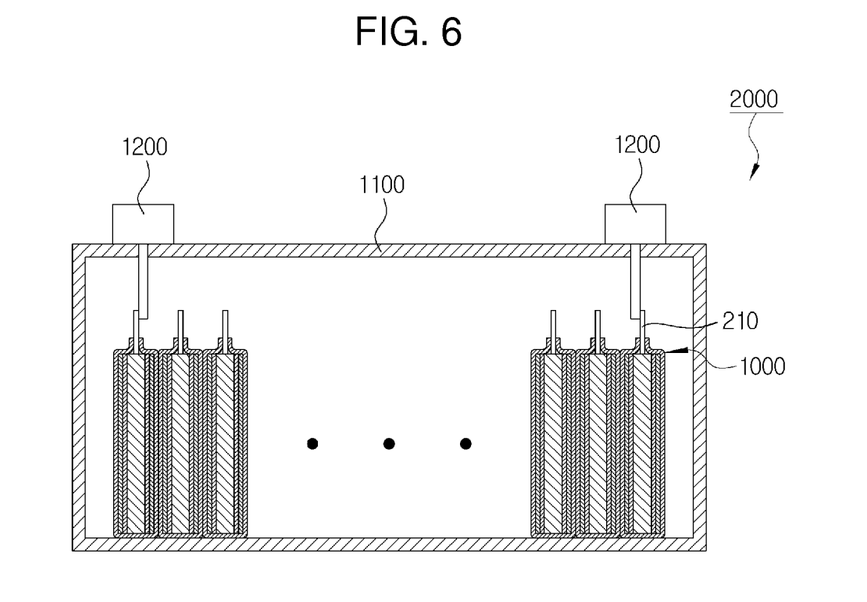
FIG. 6 is a schematic cross-sectional view showing a secondary battery pack according to an embodiment of the present invention.
Figure 7:
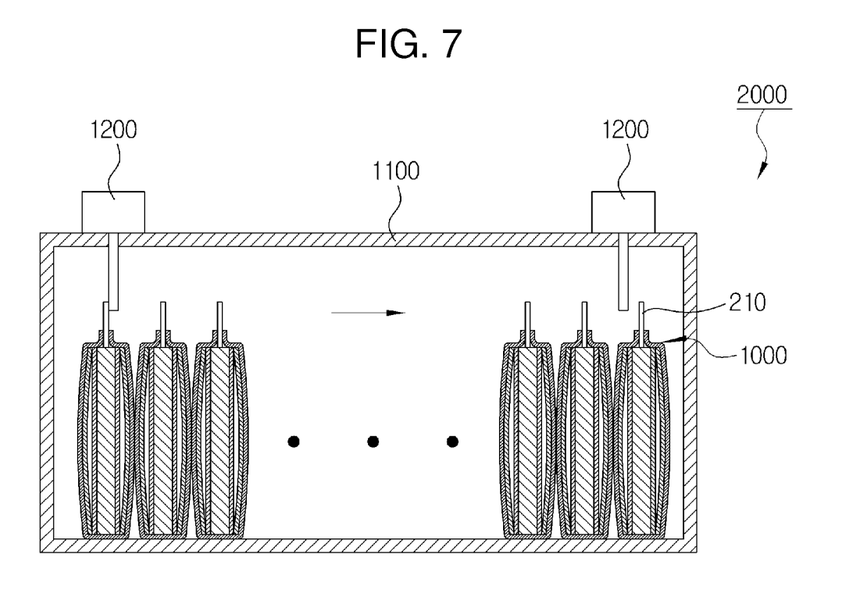
FIG. 7 is a schematic cross-sectional view showing the secondary battery pack after the second member of the second battery according to the embodiment of the present invention is deformed.

That is, as shown in FIG. 6, the plurality of secondary batteries 1000, which are stacked and arranged to be parallel to each other, are accommodated in the case 1100, and are electrically connected to each other. In addition, the electrode terminals 1200 formed on the case 1100 are connected to the electrode tab 210 of the secondary battery 100 of the outermost portion. In this case, the electrode terminal 1200 and the electrode tab 210 are coupled to each other so as to be short-circuited when specific force or more is applied thereto. In addition, the secondary batteries 1000 are formed so that the second member 400 is again not restored to the original state and maintained in the deformed state even though the temperature is decreased after the second member 400 is deformed according to the temperature increase. As a result, as shown in FIG. 7, when the secondary batteries 1000 are swelled due to an outside temperature increase or a temperature increase of a battery cell according to damage impact of the battery cell in the secondary battery, a stacked length of the secondary batteries 1000 is increased in a stacked direction, such that the electrode tab 210 and the electrode terminal 1200 which are coupled and electrically connected to each other are separated from each other, thereby blocking an electrical connection. Here, because the second members 400 of the secondary batteries 1000 are not restored to the original state and maintained in the deformed state even though the temperature is decreased, the stacked length of the secondary batteries 1000 are again not decreased, such that the electrode tab 210 and the electrode terminal 1200 may be maintained in the short-circuited state.

The secondary battery pack according to the embodiment of the present invention as described above may be used as a safety device by using characteristics of the second member that is not restored after being deformed upon overcharging or overdischarging.

Here, when a large quantity of gas has been generated in the pouch 100 due to the fine short circuit, even though a portion of the pouch 100 is opened or burst due to the generated gas and the gas is discharged to the outside of the pouch 100, the shape of the secondary battery 1000 may be maintained in a swelled state by the second member 400 maintained in the deformed state, such that the overcharging or the overdischarging of the secondary batteries having the short circuit generated therein may be prevented.

According to the embodiment of the present invention, the secondary battery may be maintained in the state in which the electrode body is adhered even in the case in which the pouch is swelled at the time of the high temperature, such that the increase in the interface resistance of the electrode body may be prevented to thereby prevent the performance degradation of the secondary battery.

In addition, the deformation of the electrode body is prevented, such that the fine short circuit may be prevented, thereby making it possible to decrease the risk of ignition and explosion of the secondary battery.

In addition, the secondary battery pack according to the embodiment of the present invention may prevent the overcharging or the overdischarging by using the second member which is not restored after being deformed, thereby improving stability.

The present invention is not limited to the above-mentioned exemplary embodiments but may be variously applied, and may be variously modified by those skilled in the art to which the present invention pertains without departing from the gist of the present invention claimed in the claims.

What is claimed is:

1. A secondary battery comprising:
    a pouch;
    an electrode body accommodated and sealed in the pouch;
    first members provided in the pouch and provided to one side or both sides of the electrode body to support the electrode body; and
    second members provided in the pouch to be parallel to the first members, formed to be adhered between the first members and the pouch, and convexly deformed toward the pouch according to a temperature increase to pressure the first members to be adhered to the electrode body, wherein the second members are formed of a shape memory alloy.

2. The secondary battery of claim 1, wherein the second members have at least one side coupled and fixed to the first member.

3. The secondary battery of claim 1, wherein second members have a deformation degree increased according to the temperature increase based on a room temperature.

4. The secondary battery of claim 1, wherein the second members initiate convex deformation toward the pouch at a temperature before a gas is generated in the pouch.

5. The secondary battery of claim 1, wherein the second members have a cross-section deformed in an arc shape.

6. The secondary battery of claim 1, wherein the second members have a portion which is not deformed even though the temperature is increased, and the portion which is not deformed is maintained to be parallel to the first member.

7. A secondary battery pack comprising:
    a plurality of secondary batteries of claim 1 stacked and arranged to be parallel to each other and electrically connected to each other;
    a case having the plurality of secondary batteries accommodated therein; and
    electrode terminals formed on the case and connected to electrode tabs of the secondary battery disposed at an outermost portion,
    wherein second members of the secondary batteries are not restored to an original state after being deformed and are maintained in a deformed state, such that the electrode terminals and the electrode tabs of the secondary battery of the outermost portion are short-circuited and again not connected to each other when the secondary batteries are swelled due to a temperature increase.

8. A secondary battery pack comprising:
    a plurality of secondary batteries of claim 2 stacked and arranged to be parallel to each other and electrically connected to each other;
    a case having the plurality of secondary batteries accommodated therein; and
    electrode terminals formed on the case and connected to electrode tabs of the secondary battery disposed at an outermost portion,
    wherein second members of the secondary batteries are not restored to an original state after being deformed and are maintained in a deformed state, such that the electrode terminals and the electrode tabs of the secondary battery of the outermost portion are short-circuited and again not connected to each other when the secondary batteries are swelled due to a temperature increase.

9. A secondary battery pack comprising:
    a plurality of secondary batteries of claim 3 stacked and arranged to be parallel to each other and electrically connected to each other;
    a case having the plurality of secondary batteries accommodated therein; and
    electrode terminals formed on the case and connected to electrode tabs of the secondary battery disposed at an outermost portion,
    wherein second members of the secondary batteries are not restored to an original state after being deformed and are maintained in a deformed state, such that the electrode terminals and the electrode tabs of the secondary battery of the outermost portion are short-circuited and again not connected to each other when the secondary batteries are swelled due to a temperature increase.

10. A secondary battery pack comprising:
    a plurality of secondary batteries of claim 4 stacked and arranged to be parallel to each other and electrically connected to each other;
    a case having the plurality of secondary batteries accommodated therein; and
    electrode terminals formed on the case and connected to electrode tabs of the secondary battery disposed at an outermost portion,
    wherein second members of the secondary batteries are not restored to an original state after being deformed and are maintained in a deformed state, such that the electrode terminals and the electrode tabs of the secondary battery of the outermost portion are short-circuited and again not connected to each other when the secondary batteries are swelled due to a temperature increase.

11. A secondary battery pack comprising:

a plurality of secondary batteries of claim 5 stacked and arranged to be parallel to each other and electrically connected to each other;

a case having the plurality of secondary batteries accommodated therein; and electrode terminals formed on the case and connected to electrode tabs of the secondary battery disposed at an outermost portion, wherein second members of the secondary batteries are not restored to an original state after being deformed and are maintained in a deformed state, such that the electrode terminals and the electrode tabs of the secondary battery of the outermost portion are short-circuited and again not connected to each other when the secondary batteries are swelled due to a temperature increase.

12. A secondary battery pack comprising:

a plurality of secondary batteries of claim 6 stacked and arranged to be parallel to each other and electrically connected to each other;

a case having the plurality of secondary batteries accommodated therein; and electrode terminals formed on the case and connected to electrode tabs of the secondary battery disposed at an outermost portion, wherein second members of the secondary batteries are not restored to an original state after being deformed and are maintained in a deformed state, such that the electrode terminals and the electrode tabs of the secondary battery of the outermost portion are short-circuited and again not connected to each other when the secondary batteries are swelled due to a temperature increase.

* * * * *